United States Patent
Gerhardt

(10) Patent No.: US 11,820,646 B2
(45) Date of Patent: *Nov. 21, 2023

(54) GRAZING RESTRICTOR

(71) Applicant: Evan Michael Gerhardt, Alden, NY (US)

(72) Inventor: Evan Michael Gerhardt, Alden, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/051,202

(22) Filed: Oct. 31, 2022

(65) Prior Publication Data

US 2023/0159320 A1 May 25, 2023

Related U.S. Application Data

(62) Division of application No. 16/442,674, filed on Jun. 17, 2019, now Pat. No. 11,485,628.

(60) Provisional application No. 62/688,910, filed on Jun. 22, 2018.

(51) Int. Cl.
*B68B 5/06* (2006.01)
*A01K 25/00* (2006.01)
*B68B 1/00* (2006.01)

(52) U.S. Cl.
CPC .............. *B68B 5/06* (2013.01); *A01K 25/00* (2013.01); *B68B 1/00* (2013.01)

(58) Field of Classification Search
CPC .................................. B68B 5/06; A01K 25/00
See application file for complete search history.

(56) References Cited

U.S. PATENT DOCUMENTS

| | | | |
|---|---|---|---|
| 805,227 A | 11/1905 | Oneal | |
| 1,511,339 A | 10/1924 | Hord | |
| 1,773,774 A | 8/1930 | Carr | |
| 2,298,265 A | 10/1942 | Ashby | |
| 7,690,332 B1 | 4/2010 | Merbeth | |
| 11,485,628 B2* | 11/2022 | Gerhardt | B68B 5/06 |
| 2010/0024743 A1 | 2/2010 | Wang | |
| 2011/0185981 A1 | 8/2011 | Mitton | |
| 2013/0112154 A1 | 5/2013 | Sheridan | |

(Continued)

FOREIGN PATENT DOCUMENTS

| | | |
|---|---|---|
| DE | 465308 C | 9/1928 |
| DE | 29904089 U1 | 12/1999 |

(Continued)

OTHER PUBLICATIONS

Extended European Search Report; European Patent Application No. 19822959.3; dated Mar. 9, 2022.

(Continued)

*Primary Examiner* — Jessica B Wong
(74) *Attorney, Agent, or Firm* — Jason Bernstein; BARNES & THORNBURG LLP

(57) ABSTRACT

A grazing restrictor for attaching to a halter. The restrictor includes a body portion surrounding a central opening. A plurality of elongate segments extend outward from the body portion. The elongate segments have a plurality of openings defined therein. The elongate segments are configured and arranged to be folded upward relative to the body portion to form the shape of a muzzle. The grazing restrictor is formed from an elastic material capable of laying flat in a first configuration and being folded into the shape of a muzzle in a second configuration.

20 Claims, 4 Drawing Sheets

(56) References Cited

U.S. PATENT DOCUMENTS

2015/0257368 A1   9/2015  Harman et al.
2021/0267170 A1   9/2021  Gerhardt

FOREIGN PATENT DOCUMENTS

| FR | 560622 A | 10/1923 |
| FR | 581775 A | 12/1924 |
| FR | 2425196 A1 | 12/1979 |
| GB | 191307652 A | 10/1913 |

OTHER PUBLICATIONS

International Search Report; International Patent Application No. PCT/US2019/038726; dated Oct. 8, 2019.
International Written Opinion; International Patent Application No. PCT/US2019/038726; dated Oct. 8, 2019.

* cited by examiner

GRAZING RESTRICTOR

CROSS-REFERENCE TO RELATED APPLICATION

The present application is a divisional of U.S. patent application Ser. No. 16/442,674, filed Jun. 17, 2019, and entitled "Grazing Restrictor," which claims priority benefit of U.S. Provisional Patent Application No. 62/688,910 filed Jun. 22, 2018, and entitled "Equine Grazing Restrictor," which are incorporated herein by reference.

TECHNICAL FIELD

The present invention relates generally to the field of products for use on animals, and more particularly to a device for restricting the intake of forage for a grazing animal.

BACKGROUND ART

Muzzles for grazing horses are known. The existing designs are relatively heavy, expensive to manufacture, and many cause irritation to the skin of the horse which requires extra padding or wrapping the surface of the muzzle to hinder rubbing. Some of the designs are rigid and need to be heated and formed to the shape of the horse. What is needed is an improved design that addresses the many drawbacks with existing muzzles.

BRIEF SUMMARY OF THE INVENTION

The present invention meets the above described need by providing a grazing restrictor (10) for attaching to a halter (34). The restrictor (10) includes a body portion (13) surrounding a central opening (16). A plurality of elongate segments (19a-19h) extend outward from the body portion (13). The elongate segments (19a-h) have a plurality of openings (25) defined therein. The elongate segments (19a-h) are capable of being folded upward relative to the body portion (13) to form the shape of a muzzle.

A plurality of ties (37) have a first end capable of being inserted through one or more of the openings (25) in the elongate segments (19a-19h) and a second end capable of extending around the halter (34) and being connected to the first end in end to end fashion such that the restrictor (10) is capable of being supported by the halter (34).

In one aspect, the body portion (13) and elongate segments (19a-19h) are formed as a unitary member.

In one aspect, the body portion (13) and elongate segments (19a-19h) are formed from an elastic material.

In yet another aspect, the body portion (13) and elongate segments (19a-19h) are constructed of polyether urethane.

In an additional aspect, the restrictor (10) may further comprise a plurality of ventilation openings (22) formed in one of the body portion (13) and the plurality of elongate segments (19a-19h).

In another aspect, the plurality of elongate segments (19a-19h) may further comprise finger-like projections having rounded edges.

In another aspect, the plurality of ties (37) comprise low profile cable ties.

In yet another aspect, the restrictor (10) further comprises one or more ventilation openings (22) in the body portion (13).

In another aspect, the restrictor (10) further comprises one or more ventilation openings (22) in the plurality of elongate segments (19a-19h).

In another aspect, the central opening (16) is sized to provide a throughput restriction on the amount of forage ingested while grazing.

In yet another aspect of the invention, a grazing restrictor (10) is configured for attaching to a halter (34). The restrictor (10) comprises a body portion (13) surrounding a central opening (16). The central opening (16) is sized to provide a throughput restriction on the amount of forage ingested while grazing. A plurality of elongate segments (19a-19h) extend outward from the body portion (13). The plurality of elongate segments (19a-19h) have a plurality of openings (25) defined therein. The plurality of elongate segments (19a-19h) are capable of being folded upward relative to the body portion (13) to form the shape of a muzzle. A plurality of ties (37) have a first end capable of being inserted through one or more of the openings (25) in the elongate segments (19a-19h) and a second end capable of extending around the halter (34) and being connected to the first end such that the restrictor (10) is capable of being supported by the halter (34) on the horse (31).

The body portion (13) and the plurality of elongate segments (19a-19h) are formed from a unitary, elastic member capable of laying flat in a first configuration and then being folded into the shape of a muzzle in a second configuration.

In another aspect of the invention, a grazing restrictor (10) is configured for attaching to a halter (34). The restrictor (10) comprises a body portion (13) having a central opening (16) sized to provide a throughput restriction on the amount of forage ingested while grazing. A plurality of elongate segments (19a-h) extend outward from the body portion (13). The aspect includes means for attaching the restrictor (10) to the halter (34). And the plurality of elongate segments (19a-19h) are configured and arranged such that, when the restrictor (10) is attached to the halter (34), the elongate segments (19a-h) are biased outwardly from the halter (34).

In another aspect of the invention, a combination includes a halter (34) and a grazing restrictor (10) configured and arranged to be mounted thereon. The restrictor (10) comprises a body portion (13) surrounding a central opening (16). The central opening (16) is sized to provide a throughput restriction on the amount of forage ingested while grazing. A plurality of elongate segments (19a-19h) extend outward from the body portion (13). The plurality of elongate segments (19a-19h) have a plurality of openings (25) defined therein. The plurality of elongate segments (19a-19h) are capable of being folded upward relative to the body portion (13) to form the shape of a muzzle. The body portion (13) and the plurality of elongate segments (19a-19h) are formed from a unitary, elastic member capable of laying flat in a first configuration and then being folded into the shape of a muzzle in a second configuration.

DESCRIPTION OF THE PREFERRED EMBODIMENTS

Figure 1:
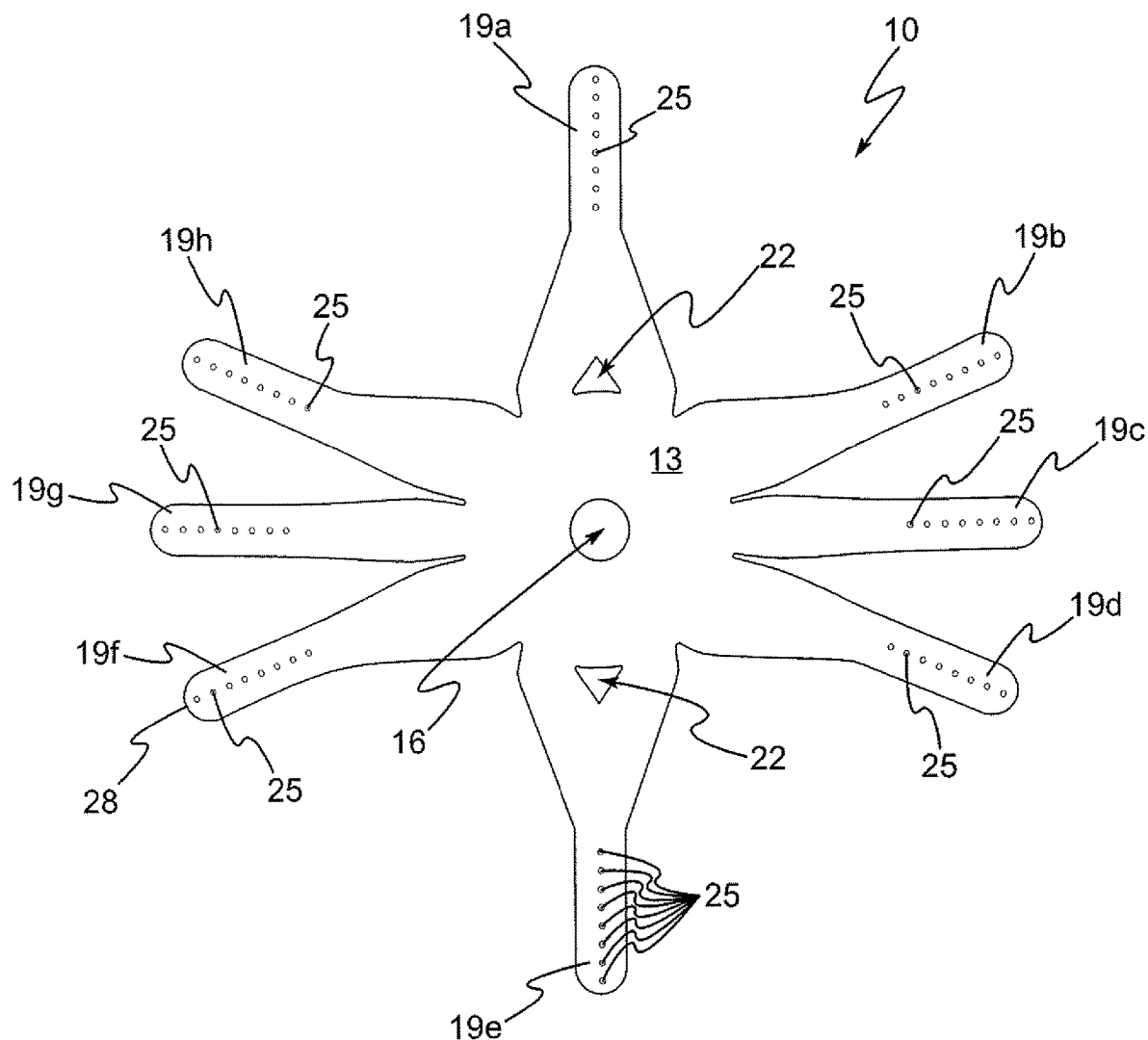
FIG. 1 is a plan view of one embodiment of the grazing restrictor of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring to FIG. 1, merely for the purposes of illustration and not by way of limitation, the present embodiment provides a grazing restrictor 10. The grazing restrictor 10 may be constructed as a unitary, flat member having a body portion 13 located toward the center of the restrictor 10. A central opening 16 may be disposed at the approximate center of the device. A plurality of elongate segments 19a-19h may extend in multiple directions from the body portion 13. Segment 19a extends upward from the body portion 13 of the restrictor 10. Segments 19b-19d extend to the right of the body portion 13. Segment 19e extends downward from the body portion 13 and may be disposed in the opposite direction from Segment 19a. Segments 19f-19h extend to the left of the body portion 13 and may be disposed opposite from Segments 19b-19d. Ventilation openings 22 may be formed in segments 19a and 19e. Additional ventilation openings may be provided in the body portion 13 or in the segments 19a-19h.

A plurality of openings 25 may be disposed in the segments 19a-19h. The openings 25 on each segment 19a-19h may be arranged in linear fashion from a first opening 25 disposed closer to the center of the device to a last opening 25 disposed near a distal end 28 of the respective segment.

The restrictor 10 may be formed from an elastomer such as a thermoplastic urethane or similar plastic polymer or other thin, lightweight material having elastic properties. The material is preferably mildew and UV resistant. For example, the restrictor 10 may be formed from a polyether urethane film or sheet. The film/sheet may be approximately 2-5 mm thick. Other thicknesses of film or sheet may also be suitable. The restrictor 10 may be die cut to form a unitary member. The restrictor may be approximately twenty (20) to twenty-eight (28) inches in diameter. The restrictor 10 may be formed from a thin, lightweight and elastic material that is capable of laying flat as shown in FIG. 1. The restrictor 10 may be formed from an elastic material such that when it is removed from the state shown in FIGS. 2-4, it returns to its original flat shape shown in FIG. 1. The restrictor 10 may be formed from a clear material and may be provided with a plurality of openings to increase ventilation.

Figure 2:
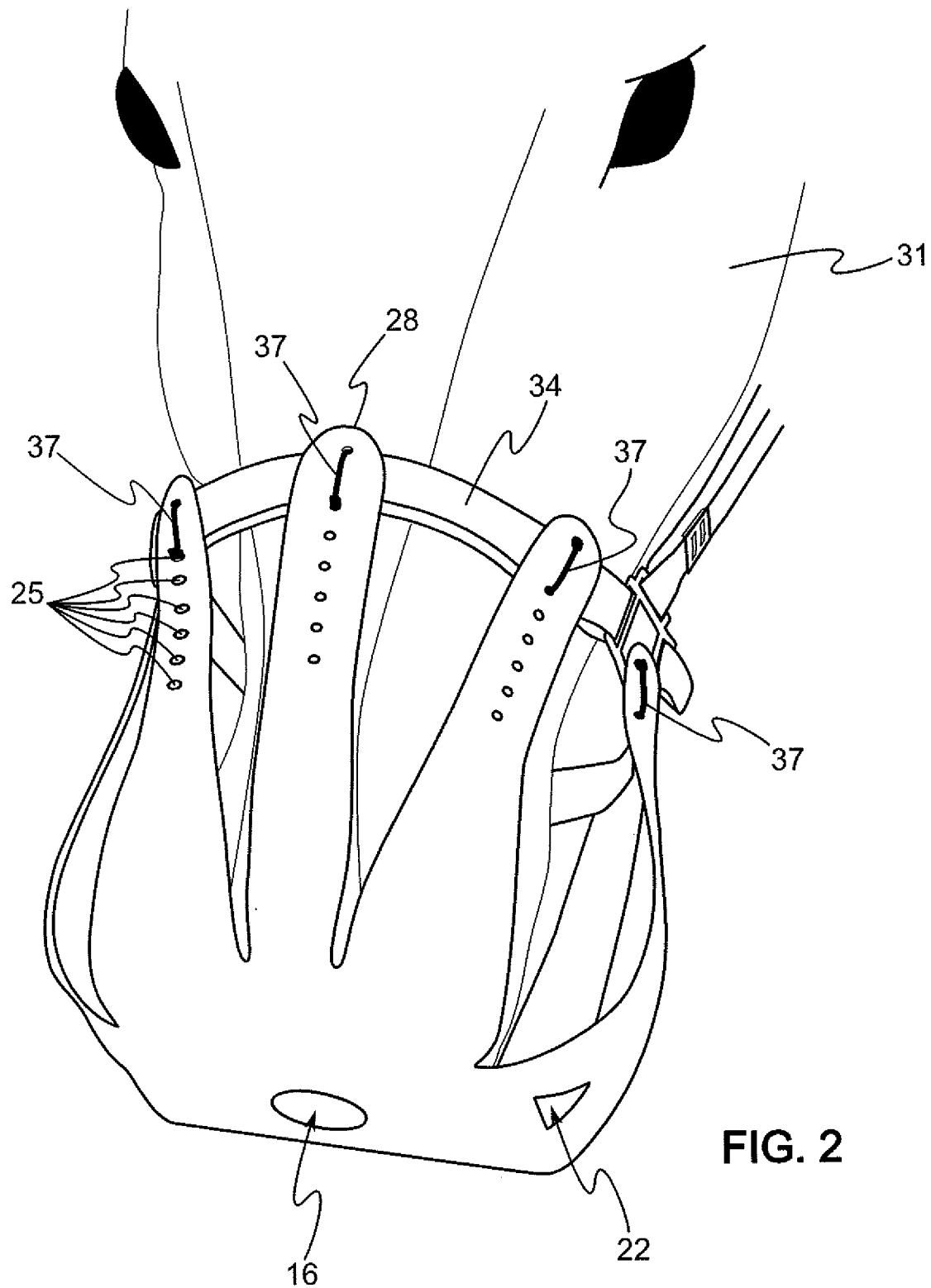
FIG. 2 is a front perspective view of the embodiment of FIG. 1 attached to a halter on a horse.
Figure 3:
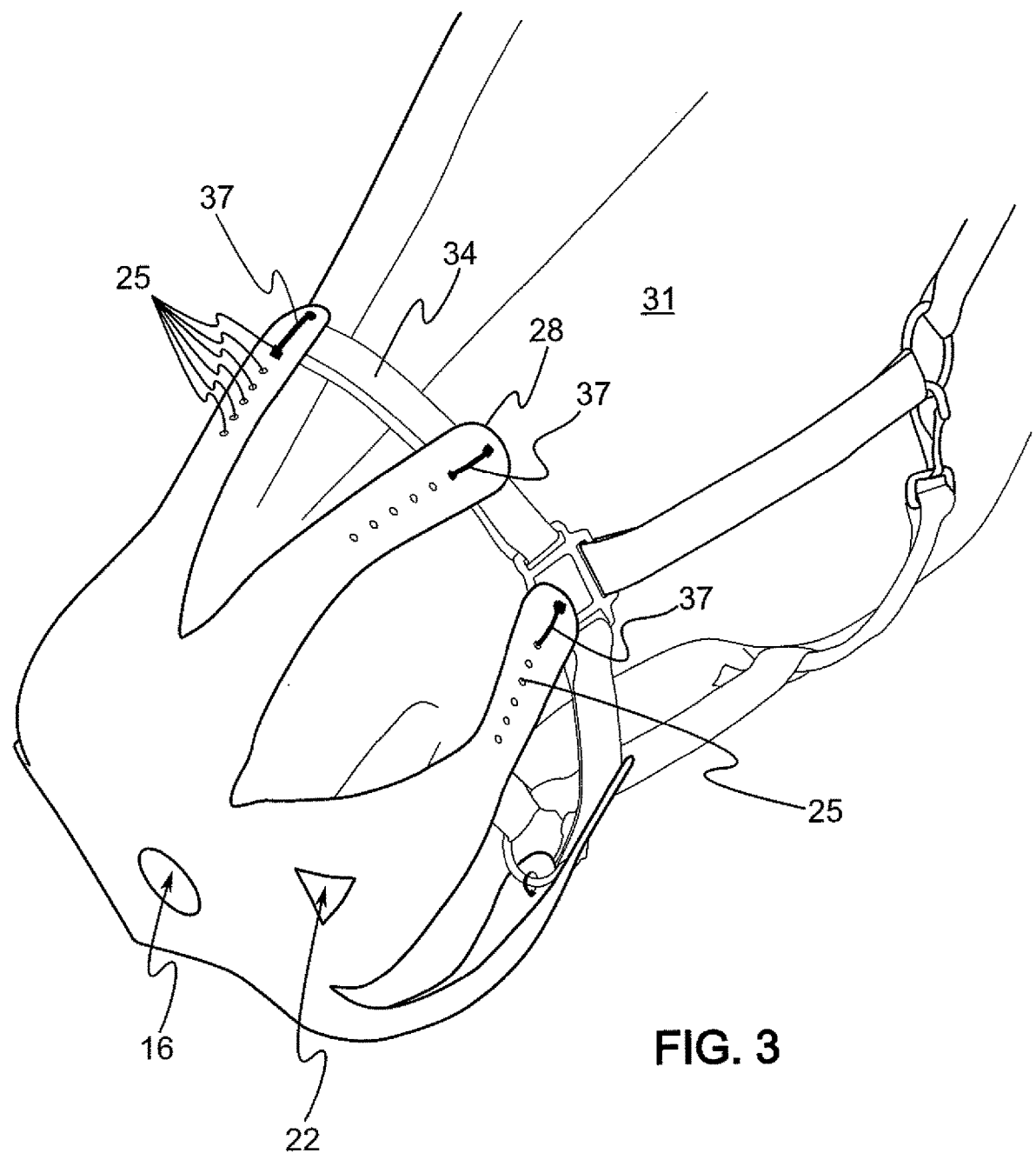
FIG. 3 is another perspective view of the embodiment of FIG. 1 attached to a halter on a horse.
Figure 4:
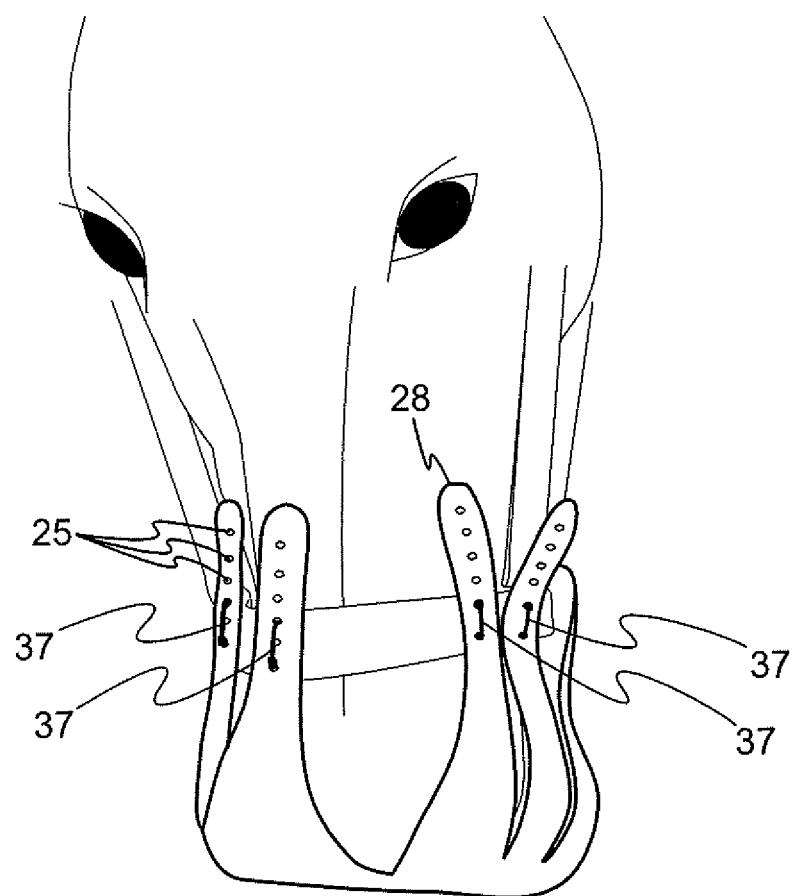
FIG. 4 is another perspective view of the embodiment of FIG. 1 attached to a halter on a horse at a different position on the plurality of elongate segments.

Turning to FIGS. 2-4, the elongate segments 19a-19h can be folded upward (i.e., normal to the page with respect to the orientation shown in FIG. 1) from the end of the body portion 13 to from a muzzle for mounting around the mouth of a horse 31. Although the restrictor 10 is shown in connection with a horse 31, the restrictor 10 may be configured and arranged for use with other animals. The muzzle is formed by attaching the elongate segments 19a-19h to a halter 34 by means of low profile cable ties 37 that may be inserted through the openings 25. The cable ties 37 are one example of elongate members having a first end and a second end configured to extend through the openings 25 in the elongate segments 19a-h and around the halters 34 and to connect in end to end fashion to attach the restrictor 10 to the halter 34. Other elongate members constructed from materials such as cloth or fabric or other flexible materials having connecting means at opposite ends may also be suitable. The fasteners at the ends of the elongate members may include buttons, quick connect couplings, or the like or could be attached by hook and loop fasteners. Alternatively, the opposite ends of the elongate member could be tied together. The restrictor 10 is adjustable by means of the plurality of openings 25. As best shown in FIG. 4, the arrangement of the openings 25 in a line provides for a single size for the restrictor 10 configured for use with various sizes of animals and halters.

The present invention also provides a combination that includes a halter 34 and a grazing restrictor 10 configured and arranged to be mounted thereon. The restrictor 10 comprises a body portion 13 surrounding a central opening 16. The central opening 16 is sized to provide a throughput restriction on the amount of forage ingested while grazing. A plurality of elongate segments 19a-19h extend outward from the body portion 13. The plurality of elongate segments 19a-19h have a plurality of openings 25 defined therein. The plurality of elongate segments 19a-19h are capable of being folded upward relative to the body portion 13 to form the shape of a muzzle. The body portion 13 and the plurality of elongate segments 19a-19h are formed from a unitary, elastic member capable of laying flat in a first configuration and then being folded into the shape of a muzzle in a second configuration.

The present invention provides many advantages including reduced weight and increased ventilation. The open design of the restrictor 10 allows for more airflow which inhibits bacterial growth. Also, the spring-like properties of the restrictor 10 provide that when the restrictor 10 is attached to the halter 34 the elongate segments 19a-h are configured and arranged such that they are biased away from the halter 34. As a result, the spring-like properties of the elastic materials used for construction keep the restrictor 10 from laying on the nose of the horse 31 thereby preventing and or reducing rubbing and irritation. The spring-like properties of the restrictor 10 also provide for minimal skin contact on any portion of the horse 31.

The present invention contemplates that many changes and modifications may be made. Therefore, while the presently-preferred form of the grazing restrictor has been shown and described, and several modifications and alternatives discussed, persons skilled in this art will readily appreciate that various additional changes and modifications may be made without departing from the spirit of the invention.

What is claimed is:

1. A grazing restrictor for attaching to a halter adapted to be worn by a grazing animal, the restrictor comprising:
   a body portion having a central opening;

a plurality of elongate segments extending outward from the body portion, the plurality of elongate segments each having a plurality of openings defined therein with each opening in the respective plurality of openings arranged at a different distance from the central opening than the other openings in the respective plurality of openings, the plurality of elongate segments configured and arranged to bend relative to the body portion to form the shape of a muzzle;

a plurality of ties configured to be inserted through one or more of the plurality of openings and around the halter; and, wherein the plurality of elongate segments are configured to position the body portion relative to the halter, the pluralities of openings defined in the plurality of elongate segments are configured to allow selective adjustment of the body portion relative to the halter with extension of the ties through openings of the pluralities of openings closer to the body portion than other openings of the pluralities of openings to position the body portion closer to the halter or through openings of the pluralities of openings farther from the body portion than other openings of the pluralities of openings to position the body portion farther from the halter, wherein the body portion and the plurality of elongate segments are formed as a unitary, elastic member configured and arranged to lay flat in a common plane in a first configuration and to be formed into the shape of a muzzle by bending the plurality of elongate segments upward relative to the body portion in a second configuration, and wherein the plurality of elongate segments are biased relative to the body portion toward the first configuration to return to the first configuration when disconnected from the halter.

2. The grazing restrictor of claim 1, wherein each tie in the plurality of ties has a first end and a second end configured to be attached in end to end fashion.

3. The grazing restrictor of claim 1, wherein the body portion and the plurality of elongate segments comprise polyether urethane.

4. The grazing restrictor of claim 1, further comprising a plurality of ventilation openings formed in at least one of the body portion and the plurality of elongate segments.

5. The grazing restrictor of claim 1, wherein the plurality of elongate segments define finger-like projections.

6. The grazing restrictor of claim 1, wherein the plurality of ties comprise low profile cable ties.

7. The grazing restrictor of claim 1, further comprising one or more ventilation openings in the plurality of elongate segments.

8. The grazing restrictor of claim 1, wherein the restrictor is formed from a transparent material.

9. The grazing restrictor of claim 1, wherein spaces are defined between the elongate segments in the second configuration.

10. The grazing restrictor of claim 1, wherein the plurality of elongate segments are configured and arranged such that, when the restrictor is in the second configuration and attached to the halter, the elongate segments are biased outwardly from the halter.

11. The grazing restrictor of claim 1, wherein the plurality of ties comprises a plurality of elongate flexible members, wherein each of the elongate flexible members has connecting means at opposite ends thereof, and wherein the connecting means are selected from the group consisting of buttons, hook and loop fasteners, and quick connect couplings.

12. The grazing restrictor of claim 1, wherein each plurality of openings defined in the plurality of elongate segments includes at least four openings arranged along a line.

13. The grazing restrictor of claim 1, wherein the central opening is sized to provide a throughput restriction on an amount of forage ingested by the grazing animal while grazing.

14. A grazing restrictor for attaching to a halter adapted to be worn by a grazing animal, the restrictor comprising:

a body portion having a central opening;

a plurality of elongate segments extending outward from the body portion, the plurality of elongate segments configured and arranged to bend relative to the body portion to form the shape of a muzzle;

a plurality of ties; and, wherein the plurality of elongate segments are configured to position the body portion relative to the halter with extension of the plurality of ties through openings of the elongate segments, wherein the body portion and the plurality of elongate segments are formed as a unitary, elastic member configured and arranged to lay flat in a common plane in a first configuration and to be formed into the shape of a muzzle by bending the plurality of elongate segments upward relative to the body portion in a second configuration, and wherein the plurality of elongate segments are biased relative to the body portion toward the first configuration to return to the first configuration when disconnected from the halter.

15. The grazing restrictor of claim 14, further comprising a plurality of ventilation openings formed in at least one of the body portion and the plurality of elongate segments.

16. The grazing restrictor of claim 14, wherein the restrictor is formed from a transparent material.

17. The grazing restrictor of claim 14, wherein spaces are defined between the elongate segments in the second configuration.

18. The grazing restrictor of claim 14, wherein the plurality of elongate segments are configured and arranged such that, when the restrictor is in the second configuration and attached to the halter, the elongate segments are biased outwardly from the halter.

19. The grazing restrictor of claim 14, wherein the plurality of ties comprises a plurality of elongate flexible members, wherein each of the elongate flexible members has connecting means at opposite ends thereof, and wherein the connecting means are selected from the group consisting of buttons, hook and loop fasteners, and quick connect couplings.

20. The grazing restrictor of claim 14, wherein the central opening is sized to provide a throughput restriction on an amount of forage ingested by the grazing animal while grazing.

* * * * *